United States Patent [19]

Nishimura

[11] Patent Number: 5,422,948
[45] Date of Patent: Jun. 6, 1995

[54] SUBSCRIBER LINE INTERFACE FOR IMPROVING THE FREQUENCY CHARACTERISTICS OF THE TRANSMITTED AND RECEIVED SIGNALS

[75] Inventor: Kouichi Nishimura, Tokyo, Japan

[73] Assignee: NEC Corporation, Tokyo, Japan

[21] Appl. No.: 304,598

[22] Filed: Sep. 12, 1994

Related U.S. Application Data

[63] Continuation of Ser. No. 670,027, Mar. 15, 1991, abandoned.

[30] Foreign Application Priority Data

Mar. 16, 1990 [JP] Japan .................................. 2-66525

[51] Int. Cl.⁶ .............................................. H04B 3/32
[52] U.S. Cl. ...................................... 379/399; 379/402;
379/345
[58] Field of Search ............... 379/399, 402, 405, 338,
379/339, 344, 345, 346

[56] References Cited

U.S. PATENT DOCUMENTS

| | | | |
|---|---|---|---|
| 4,682,356 | 7/1987 | Minch et al. | 379/338 |
| 4,896,351 | 1/1990 | Stader et al. | 379/399 |
| 4,916,734 | 4/1990 | Stader et al. | 379/399 |
| 4,953,206 | 8/1990 | Friesen et al. | 379/399 |

Primary Examiner—James L. Dwyer
Assistant Examiner—M. Shehata

[57] ABSTRACT

A subscriber line interface circuit, coupled between a telephone unit terminal and a switching system, includes a coding and decoding circuit for controlling analog voltages inputted thereinto and outputted therefrom, using a direct current bias voltage, and an interface circuit. The interface circuit has an amplifier for detecting the analog voltage output, a unit for detecting a direct current bias voltage of the analog voltage output, a subtracting unit for determining the difference between the detected analog voltage output and the detected bias voltage, and resistors for driving the telephone unit terminal on the two-wire side. The analog voltage and the direct current bias voltage output terminals of the encoding and decoding circuit are directly connected with the input terminal of the amplifier for detecting the outputted analog voltage and the interface circuit, respectively, so that only a desired alternating current signal is outputted to the telephone unit terminal on its two-wire side.

10 Claims, 3 Drawing Sheets

SUBSCRIBER LINE INTERFACE FOR IMPROVING THE FREQUENCY CHARACTERISTICS OF THE TRANSMITTED AND RECEIVED SIGNALS

This is a continuation of application Ser. No. 07/670,027, filed Mar. 15, 1991, now abandoned.

BACKGROUND OF THE INVENTION

The present invention relates to a subscriber line interface circuit and, in particular, to a subscriber line interface circuit having an interfacing capability between analog and digital circuits.

Such a subscriber line interface circuit has been heretofore connected between an analog telephone terminal and a digital switching system and comprises an interface circuit and an encoding and decoding circuit.

FIG. 1 is a block diagram of a subscriber line interface circuit showing such a prior art.

The prior art subscriber line interface circuit comprises an interface circuit 1A and an encoding and decoding 2A (hereinafter referred to as CODEC) having a single power source as shown in FIG. 1. In these circuits, an analog output $A_O$ of the CODEC 2A is connected with an input terminal RX of four-wires 4W (hereinafter referred to as four-wire side input terminal) of the interface circuit 1A via a capacitor C2. A resistor R4 is connected between the RX terminal and the ground (GND). An analog input $A_I$ of the CODEC 2A is connected with an output terminal TX (hereinafter referred to as four-wire side output terminal) via a capacitor C1. A resistor R3 is connected between the terminal $A_I$ and a reference voltage output terminal ($V_{RO}$). These capacitors C1 and C2 serve to eliminate a d.c. bias voltage which is a reference voltage imposed upon the analog input output terminals $A_I$ and $A_O$ for passing only an a.c. signal.

When the analog output $A_O$ of the CODEC is directly connected with the terminal RX of the interface circuit in the afore-mentioned prior art subscriber line interface circuit having the encoding and decoding circuit with a single power source and the interface circuit, power supply to the two-wire side is influenced by the d.c. bias voltage at the output $A_O$ of the CODEC. Accordingly, a d.c. eliminating capacitor C2 is used to eliminate an influence of the direct current. However, since the signal which passes through the capacitor is analog, the capacitor requires a relatively high capacity. The analog input $A_I$ of the CODEC surely requires the capacitor C1 since the voltage on the interface circuit side is 30 to 40 volts which are larger than that of the terminal $A_I$.

The prior art subscriber line interface circuit has a disadvantage that the frequency characteristics becomes worse since the interface circuit is usually coupled with the CODEC via capacitors in such a manner. In the prior art circuit, a high capacity capacitor cannot be built-in an LSI and should be externally added. Therefore, there is a disadvantage that the line circuit on which the capacitors are mounted is cumbersome and expensive.

SUMMARY OF THE INVENTION

It is an object of the present invetion to provide a compact and inexpensive subscriber line interface circuit in which the frequency characteristics is improved.

In order to accomplish the afore-mentioned object, the present invention provides A subscriber line interface circuit coupled between a telephone unit terminal and a switching system, comprising a coding and decoding circuit for controlling analog inputted and outputted voltages with a direct current bias voltage and the interface circuit including means for detecting said analog output, means for detecting a direct current bias voltage of said analog output, substracting means for determining the difference between said detected analog outputted voltage and said detected bias voltage and means for driving the telephone unit terminal on the two-wire side, the analog voltage and the direct current bias voltage output terminals of said encoding and decoding circuit being directly connected with the input terminal of said analog outputted voltage detecting means and the direct current bias voltage input terminal of said interface circuit, respectively whereby only desired alternating current signal is outputted to the telephone unit terminal on the two-wire side.

BRIEF DESCRIPTION OF THE DRAWINGS

These and other objects and advantages of the invention will become more apparent by reading the following description of the embodiments with reference to the drawings in which.

DESCRIPTION OF THE PREFERRED EMBODIMENTS

Preferred embodiments of the present invention will be described with reference to the accompanying drawings.

Figure 1:
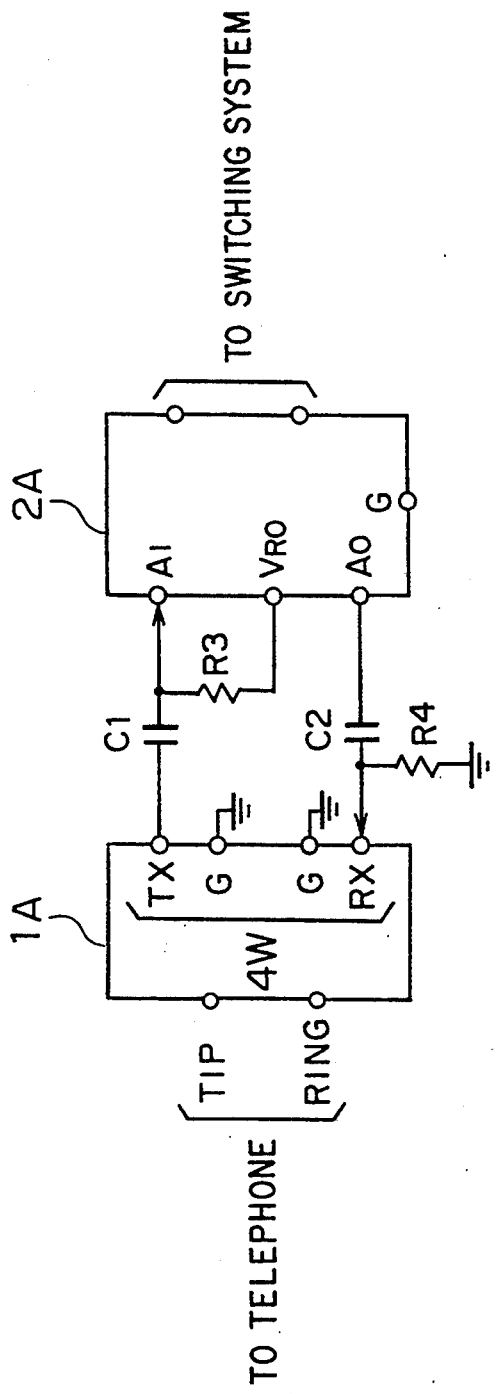
FIG. 1 is a block diagram of a prior art subscriber line interface circuit.
Figure 2:
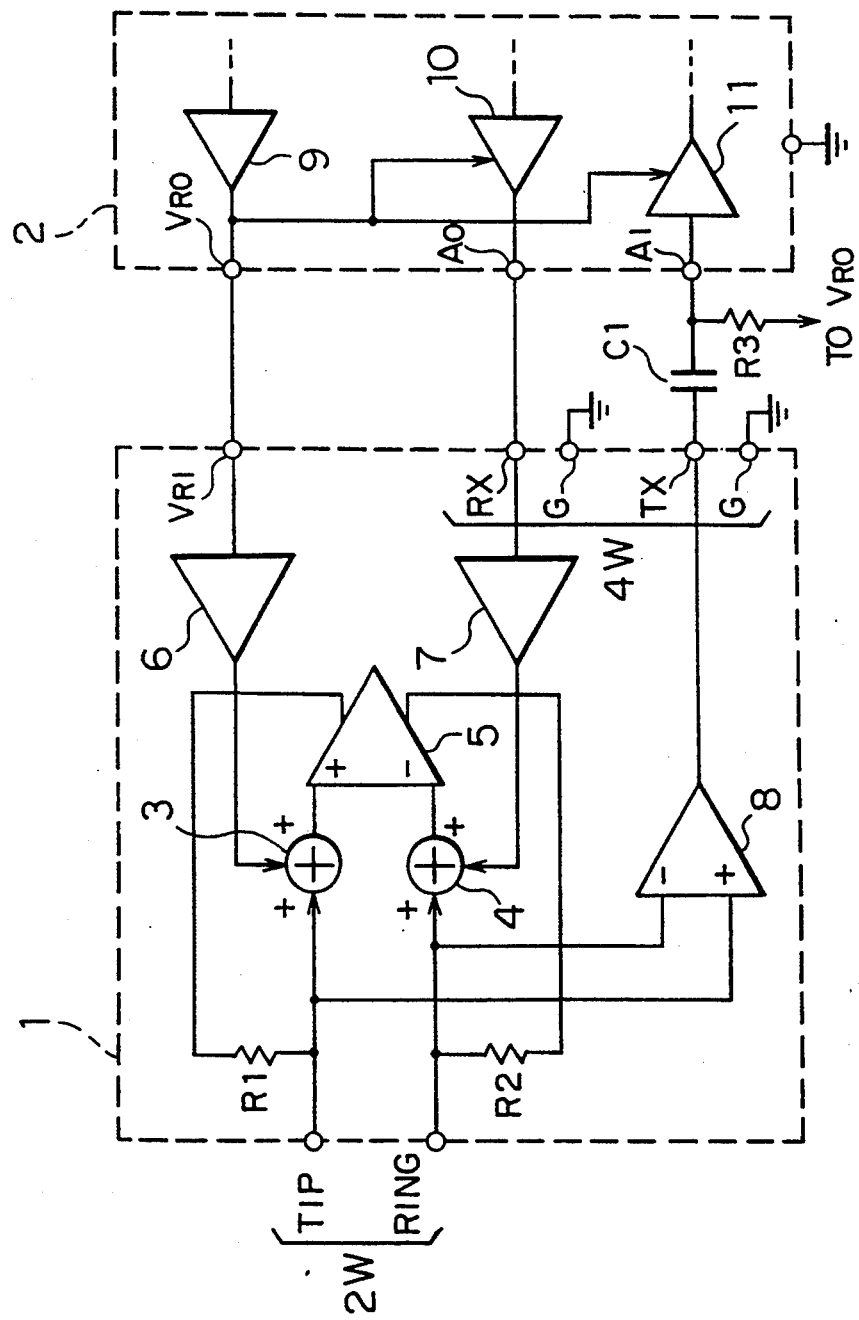
FIG. 2 is a block diagram showing a first embodiment of a subscriber line interface circuit of the present invention.

Referring now to FIG. 2, there is shown a first embodiment of a subscriber line interface circuit of the present invention.

The subscriber's circuit of the present embodiment is connected between telephone unit terminals (not shown) coupled with terminals TIP and RING and a switching system (not shown) and comprises an interface circuit 1 and an encoding and decoding circuit (CODEC) 2.

The interface circuit 1 comprises a voltage detecting amplifier 7 serving as means for detecting an analog output $A_O$ from the CODEC 2 via a terminals RX of input and output terminals 4W; a voltage detecting amplifier 6 serving as means for detecting a d.c. bias voltage ($V_{RO}$) of an analog output $A_O$ via a d.c. bias voltage output terminal $V_{RI}$ from a d.c. bias voltage output terminals of the CODEC 2; adders 3 and 4 connected with terminal TIP and RING for adding outputs of the voltage detecting amplifiers 6 and 7 to signals from the terminals TIP and RING, respectively; a balanced amplifier 5 connected with the outputs of the adders 3 and 4 which serves as subtracting means for determining the difference between the detected analog output $A_O$ and the detected direct current bias voltage $V_{RO}$, a differential amplifier 8 connected with the terminals TIP and RING for determining the difference between the signals thereon; and resistors R1 and R2 each having one and connected with the output of the balanced amplifier 5 and the terminal TIP or RING, which serves as means for driving the telephone unit terminals on the two-wire side by the output thereof.

In the embodiment, the CODEC 2 has buffer amplifiers 9–11, and, out of these amplifiers, the amplifiers 10, 11 receive d.c. bias voltage output from the buffer amplifier 9 as the reference voltages for making amplifying operations.

In the present embodiment, the analog output terminal $A_O$ and the d.c. bias voltage output terminal $V_{RO}$ of the CODEC 2 are directly connected with the input terminal RX for detecting the analog output and the d.c. bias voltage input terminal $V_{RI}$ of the interface circuit 1, respectively so that only a desired a.c. signal is outputted to the telephone terminal on the two-wire side.

The embodiment will now described in more details.

The outputs of the balanced amplifier 5 in the interface circuit 1 are connected with the two-wire side terminals TIP and RING via resistor R1 and R2. Feedback is applied from the terminals TIP and RING to the input of the balanced amplifier 5 so that desired impedances are obtained based on these resistors R1 and R2. That is, a signal is inputted to the adder 3 from the terminal TIP and the output of the adder 3 is inputted to one of the differential inputs (positive side) of the balanced amplifier 5. A signal is inputted to the adder 4 from the terminal RING and the output of the adder 4 is inputted to one of the differential inputs (negative side) of the balanced amplifiers 5.

The terminal RX of the four-wire side input terminals in the interface circuit 1 is connected with the input of the voltage detecting amplifier 7 so that the output thereof is supplied to the other input of the afore-mentioned adder 4.

Since the analog output $A_O$ of the CODEC having a single power source is directly connected with the terminal RX, the d.c. bias voltage of the analog output $A_O$ is also added. Therefore, in order to subtract this d.c. bias voltage, an output terminal $V_{RO}$ having a reference voltage $V_{REF}$ which is a d.c. bias voltage of the analog output $A_O$ of the CODEC 2 is connected with the voltage detecting amplifier 6 for detecting the d.c. bias voltage, the output of which is connected with the other input of the adder 3 in the interface circuit 1.

In brief, subtracting operation is performed by an application of opposite polarity inputs to the balanced amplifier 5 in the afore-mentioned operation. This makes it possible to eliminate the influence of the d.c. bias voltage to the power supply of the two-wire side.

Figure 3:
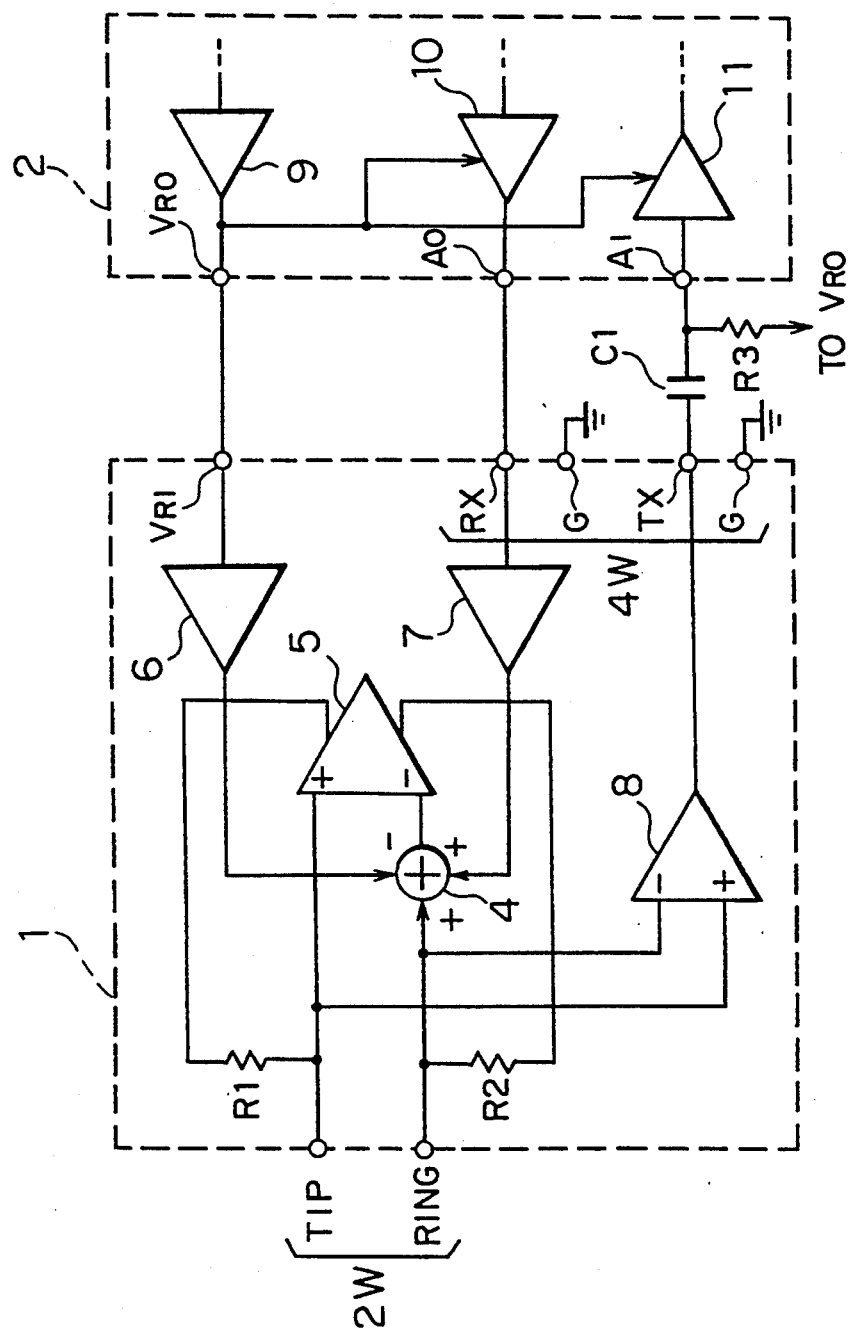
FIG. 3 is a block diagram showing a second embodiment of a subscriber line interface circuit of the present invention.

Referring now to FIG. 3, there is showing a second embodiment of a subscriber line interface circuit of the present invention.

As shown in FIG. 3, the present embodiment is identical with the above-mentioned first embodiment except that the output of the voltage detecting amplifier 6 for detecting the d.c. bias voltage is reversed and then coupled to another input of the adder 4, which performs a subtracting operation of a d.c. bias voltage from an analog output signal including the d.c. bias voltage of the CODEC 2.

In other words, addition of the analog output signal to an inverted signal of the d.c. bias voltage is equivalent to subtraction of a signal of a d.c. bias voltage from an analog output signal.

As a result of this, only an a.c. signal is outputted to the two-wire side as is similar to the above-mentioned first embodiment. No influence of the d.c. bias voltage of the $A_O$ output of the CODEC 2 will not be given to the two-wire side. The present embodiment is advantageous in that the adder 3 may be eliminated although the number of inputs to the adder 4 increases.

As mentioned above, the subscriber line interface circuit of the present invention includes an interface circuit comprising means having a voltage detecting amplifier and the like for detecting a d.c. bias voltage of an analog output and subtracting means for determining the difference between the analog output and said detected d.c. bias voltage so that an analog output terminal of the CODEC can be directly connected with an RX input terminal of the interface circuit.

Accordingly, the present invention can improve the frequency characteristics of the subscriber line interface circuit. Since the present invention can eliminate some of external capacitors, the compact and inexpensive subscriber's circuit can be realized. Since the d.c. bias voltage of the CODEC provides a bias voltage for means for detecting an analog output as well as an output idling current in accordance with the present invention, the output of the analog output detecting means may not be of bipolar type. Since noised generated in the d.c. bias voltage of the CODEC is cancelled by the subtraction operation in accordance with the present invention, the noise is reduced.

What is claimed is:

1. A subscriber line interface circuit coupled between a telephone unit terminal and a switching system, for improving frequency characteristics of transmitted and received signals, and comprising:

a coding and decoding circuit, coupled to the switching system, for controlling analog voltages inputted into said coding and decoding circuit and outputted therefrom using a direct current bias voltage, said coding and decoding circuit having an analog voltage output terminal and a direct current bias voltage output terminal; and an interface circuit coupled to the telephone unit terminal and connected to said coding and decoding circuit, said interface circuit including:

first means for detecting an output of an analog voltage from said coding and decoding circuit;

second means for detecting a direct current bias voltage of said output of the analog voltage; and subtracting means for obtaining a difference between outputs of said first and second means and supplying a signal representing said difference to said telephone unit terminal;

said analog voltage output terminal of said coding and decoding circuit being directly connected with an input terminal of said first means of said interface circuit, and said interface circuit being directly connected with said direct current bias voltage output terminal of said coding and decoding circuit so that only a desired alternating current signal is outputted to said telephone unit terminal on a two-wire side thereof.

2. A subscriber line interface circuit as defined in claim 1 in which said subtracting means comprises a balanced amplifier.

3. A subscriber line interface circuit as defined in claim 1 in which said second means for detecting the direct current bias voltage comprises a voltage detecting amplifier.

4. A subscriber line interface circuit coupled between a telephone unit terminal and a switching system, for improving frequency characteristics of transmitted and received signals, and comprising:

a coding and decoding circuit, coupled to the switching system, for controlling analog voltages inputted into said coding and decoding circuit and outputted therefrom using a direct current bias voltage, said coding and decoding circuit having an analog voltage output terminal and a direct current bias voltage output terminal; and an interface circuit coupled to the telephone unit terminal and connected to said coding and decoding circuit, said interface circuit including:

first means for detecting an output of an analog voltage from said coding and decoding circuit;

second means for detecting a direct current bias voltage of said output of the analog voltage;

subtracting means for obtaining a difference between outputs of said first and second means and supplying a signal representing said difference to said telephone unit terminal; and means for receiving the signal representing said difference to transmit said signal to said telephone unit terminal on a two-wire side thereof, said analog voltage output terminal of said coding and decoding circuit being directly connected with an input terminal of said first means of said interface circuit, and said interface circuit being directly connected with said direct current bias voltage output terminal of said coding and decoding circuit so that only a desired alternating current signal is outputted to said telephone unit terminal on a two-wire side thereof.

5. A subscriber line interface circuit as defined in claim 4 in which said subtracting means comprises a balanced amplifier.

6. A subscriber line interface circuit as defined in claim 4 in which said means for detecting the direct current bias voltage comprises a voltage detecting amplifier.

7. A subscriber line interface circuit, coupled between a telephone unit terminal and a switching circuit, for improving frequency characteristics of transmitted and received signals, and comprising:

a coding and decoding circuit, coupled to the switching system, for controlling analog voltages inputted into said coding and decoding circuit and outputted therefrom using a direct current bias voltage, said coding and decoding circuit having an analog voltage output terminal and a direct current bias voltage output terminal; and an interface circuit coupled to the telephone unit terminal and connected to said coding and decoding circuit, said interface circuit including:

first means for detecting an output of an analog voltage from said coding and decoding circuit;

second means for detecting a direct current bias voltage of said output of the analog voltage;

at least two adding means for adding outputs of said first means and said second means, respectively, to signals from respective terminals coupled to the telephone unit terminal to obtain a sum output of said first means and a sum output of said second means; and subtracting means connected to said two adding means for obtaining a difference between sum outputs of said first means and said second means, and supplying a signal representing said difference to said telephone unit terminal;

said analog voltage output terminal of said coding and decoding circuit being directly connected with an input terminal of said first means of said interface circuit, and said interface circuit being directly connected with said direct current bias voltage output terminal of said coding and decoding circuit so that only a desired alternating current signal is outputted to said telephone unit terminal on a two-wire side thereof.

8. A subscriber line interface circuit, coupled between a telephone unit terminal and a switching system, for improving frequency characteristics of transmitted and received signals, and comprising:

a coding and decoding circuit, coupled to the switching system, for controlling analog voltages inputted into said coding and decoding circuit and outputted therefrom using a direct current bias voltage, said coding and decoding circuit having an analog voltage output terminal and a direct current bias voltage output terminal; and an interface circuit coupled to the telephone unit terminal and connected to said coding and decoding circuit, said interface circuit including:

first means for detecting an output of said analog voltage from said coding and decoding circuit;

second means for detecting a direct current bias voltage of said output of the analog voltage; and adding means for adding outputs of one of said first means and said second means to inverted outputs of another of said first means and said second means to generate a signal representing a sum of said outputs and supplying said signal to said telephone unit terminal on a two wire side thereof, said analog voltage output terminal of said coding and decoding circuit being directly connected with an input terminal of said first means of said interface circuit, and said interface circuit being directly connected with said direct current bias voltage output terminal of said coding and decoding circuit so that only a desired alternating current signal is outputted to said telephone unit terminal on the two-wire side thereof.

9. A subscriber line interface circuit, coupled between a telephone unit terminal and a switching circuit, for improving frequency characteristics of transmitted and received signals, and comprising:

a coding and decoding circuit, coupled to the switching system, for controlling analog voltages inputted into said coding and decoding circuit and outputted therefrom using a direct current bias voltage, said coding and decoding circuit having an analog voltage output terminal and a direct current bias voltage output terminal; and an interface circuit coupled to the telephone unit terminal and connected to said coding and decoding circuit, said interface circuit including:

first means for detecting an output of an analog voltage from said coding and decoding circuit;

second means for detecting a direct current bias voltage of said output of the analog voltage;

at least two adding means for adding outputs of said first means and said second means, respectively, to signals from respective terminals coupled to the telephone unit terminal to obtain a sum output of said first means and a sum output of said second means;

subtracting means connected to said two adding means for obtaining a difference between sum outputs of said first means and said second means, and supplying a signal representing said difference to said telephone unit terminal; and means for receiving the signal representing the difference to transmit said signal to said telephone unit terminal on a two-wire side thereof, said analog voltage output terminal of said coding and decoding circuit being directly connected with an input terminal of said first means of said interface circuit, and said interface circuit being directly connected with said direct current bias voltage output terminal of said coding and decoding circuit so that only a desired alternating current signal is outputted to said telephone unit terminal on a two-wire side thereof.

10. A subscriber line interface circuit, coupled between a telephone unit terminal and a switching system, for improving frequency characteristics of transmitted and received signals, and comprising:

a coding and decoding circuit, coupled to the switching system, for controlling analog voltages inputted into said coding and decoding circuit and outputted therefrom using a direct current bias voltage, said coding and decoding circuit having an analog voltage output terminal and a direct current bias voltage output terminal; and an interface circuit coupled to the telephone unit terminal and connected to said coding and decoding circuit, said interface circuit including:

first means for detecting an output of said analog voltage from said coding and decoding circuit;

second means for detecting a direct current bias voltage of said output of the analog voltage; and adding means for adding outputs of one of said first means and said second means to inverted outputs of another of said first means and said second means to generate a signal representing a sum of said outputs; and means for receiving said signal to transmit said signal to said telephone unit terminal on a two wire side thereof, said analog voltage output terminal of said coding and decoding circuit being directly connected with an input terminal of said first means of said interface circuit, and said interface circuit being directly connected with said direct current bias voltage output terminal of said coding and decoding circuit so that only a desired alternating current signal is outputted to said telephone unit terminal on the two-wire side thereof.

* * * * *